US006983082B2

(12) United States Patent
Duiker

(10) Patent No.: US 6,983,082 B2
(45) Date of Patent: Jan. 3, 2006

(54) REALITY-BASED LIGHT ENVIRONMENT FOR DIGITAL IMAGING IN MOTION PICTURES

(75) Inventor: Haarm-Pieter Duiker, San Francisco, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 29 days.

(21) Appl. No.: 10/715,775

(22) Filed: Nov. 17, 2003

(65) Prior Publication Data

US 2004/0150641 A1    Aug. 5, 2004

Related U.S. Application Data

(60) Provisional application No. 60/426,560, filed on Nov. 15, 2002.

(51) Int. Cl.
G06K 9/36        (2006.01)
G09G 5/00        (2006.01)

(52) U.S. Cl. ...................... 382/284; 382/167; 382/274; 382/278; 345/619; 345/629; 345/632; 348/578; 348/584; 348/587; 352/85

(58) Field of Classification Search ................ 382/284, 382/274, 278, 167; 345/632, 629, 619, 473, 345/589, 625; 348/578, 584, 586, 587, 598; 352/85–87
See application file for complete search history.

(56) References Cited

U.S. PATENT DOCUMENTS 5,894,309 A  *  4/1999 Freeman et al. ............ 345/426
6,044,180 A      3/2000 Brandestini et al.
6,124,864 A      9/2000 Madden et al.
6,148,113 A    11/2000 Wolverton et al.
6,160,907 A  * 12/2000 Robotham et al. ......... 382/154
6,166,744 A    12/2000 Jaszlics et al.
6,313,842 B1 * 11/2001 Tampieri .................... 345/426
6,519,360 B1    2/2003 Tanaka
6,538,396 B1    3/2003 Vlahos et al.
6,552,731 B1    4/2003 Gonsalves
6,564,108 B1    5/2003 Markar et al.

(Continued)

OTHER PUBLICATIONS

"Image-Based Lighting" by Paul Debevec (USC) and Dan Lemmon (Digital Domain), Siggraph 2001 Course #14; Aug. 12, 2001; part1.pdf—Intro, HDRI, (pp. 1-51); Part 1, www.debevec.org/IBL2001.
"Image Based Lighting" by Paul Debevec, Siggraph 2001; Course #14, Aug. 12, 2001; part2.pdf—Compositing into Scenes, Fiat Lux, Light Stages 1-3; Part 2.

(Continued)

Primary Examiner—Bhavesh M. Mehta
Assistant Examiner—Aaron Carter
(74) Attorney, Agent, or Firm—O'Melveny & Myers LLP

(57) ABSTRACT

Image-based lighting for use in rendering of digital objects is derived from image data collected from a real motion-picture set. The image data includes sets of correlated images at different exposure levels, each corresponding to a selected location. The image data is processed to define an extended dynamic range panoramic image for each selected set location. The image data is color and intensity corrected based on a scaled reference object. At least key lights are modeled for the set by processing a plurality of such panoramic images. Other lighting may be defined by interpolating from the panoramic images to mathematically define a location-specific set of fill lights. In the alternative, other set lighting may be modeled by projecting panoramic image data onto a dynamically sub-dividable light primitive derived from the set geometry. Any desired object may then be rendered using the defined lights, and inserted into a corrected real image of the set at the desired location.

28 Claims, 4 Drawing Sheets

U.S. PATENT DOCUMENTS

| | | | |
|---|---|---|---|
| 6,628,298 B1 * | 9/2003 | Debevec | 345/632 |
| 6,628,830 B1 | 9/2003 | Yamazoe et al. | |
| 6,657,637 B1 | 12/2003 | Inagaki et al. | |
| 6,685,326 B2 * | 2/2004 | Debevec et al. | 362/11 |
| 2002/0122589 A1 * | 9/2002 | Reiman et al. | 382/167 |
| 2002/0186314 A1 | 12/2002 | Debevec | |
| 2003/0012448 A1 | 1/2003 | Kimmel et al. | |
| 2003/0103057 A1 | 6/2003 | Graves et al. | |
| 2003/0202120 A1 | 10/2003 | Mack | |

OTHER PUBLICATIONS

"Image-based Lighting in Lightwave 3D" by Arnie Cachelin, Image-based Lighting in Lightwave 2001, pp. 1-4.

"High Dynamic Range Imaging" by Greg Ward, May 21, 2001; pp. 1-15.

* cited by examiner

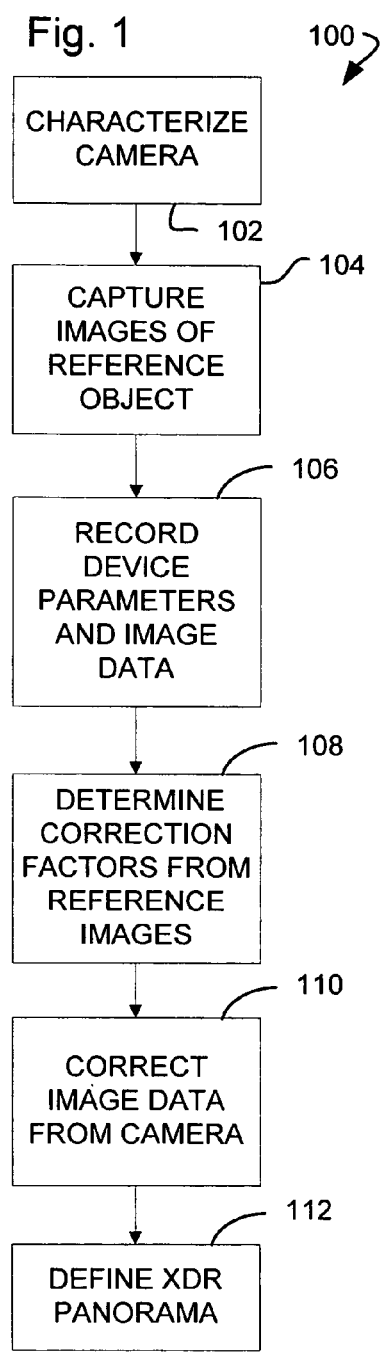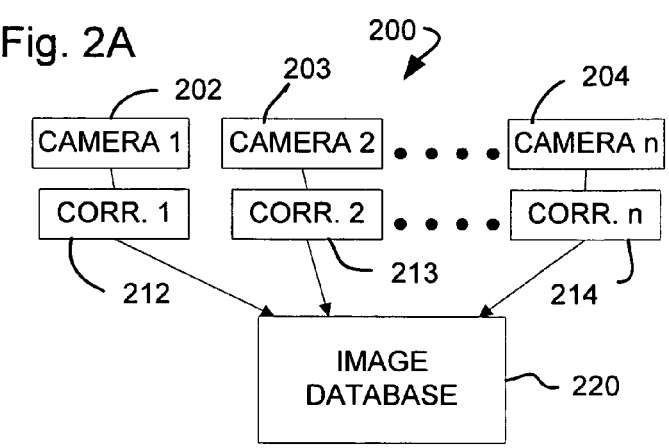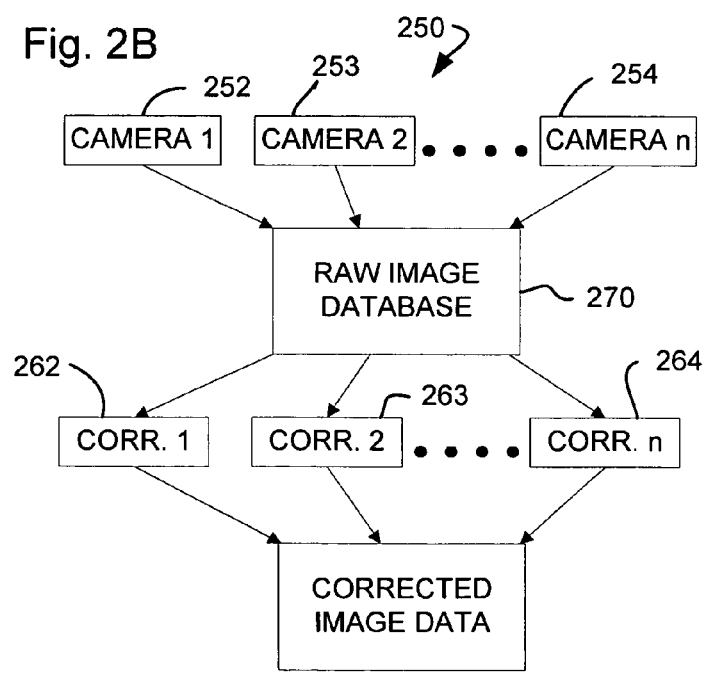

REALITY-BASED LIGHT ENVIRONMENT FOR DIGITAL IMAGING IN MOTION PICTURES

CROSS-REFERENCE TO RELATED APPLICATION

This application claims priority pursuant to 35 U.S.C. §119(e) to U.S. Provisional Application No. 60/426,560, filed Nov. 15, 2002, which application is specifically incorporated herein, in its entirety, by reference.

BACKGROUND OF THE INVENTION

1. Field of the Invention

The present invention relates to methods in the field of digital imaging, and more particularly, to methods for defining lighting environments for rendering digital objects in real scenes for motion picture production.

2. Description of Related Art

For the production of motion pictures, it is often desirable to combine digitally rendered images with images of a real scene such as may be captured by traditional film cameras or by more modern digital cameras. For example, it may be desirable to digitally create special effects within a filmed scene that would be more expensive or even impossible to achieve using traditional special effects tools. Yet, it is also desirable that the special effect appear to be completely real so as to preserve the illusion of reality. Methods for rendering digital objects for insertion into photographic images, including what is sometimes referred to as "image-based lighting," are known in the art. In brief, image-based lighting refers to the practice of gathering real-world information about lighting at a particular point in a photographed scene, and then using that information to render a digital object. The rendered object is thereby illuminated in much the same way as if it were a real object located in the scene, and may be inserted into a photographic image of the scene without appearing out of place.

Although the basic principles of image-based lighting are well understood, prior-art methods for combining digitally rendered objects with photographic data are subject to several limitations, particularly when used for digitally imaging in motion pictures. These limitations may become more apparent as digital special effects are increasingly used in different motion pictures environments, from feature films to made-for-television productions of all types, including but not limited to television series, commercials, and special productions.

A first limitation arises in the multi-camera world of most production studios. More than one camera is almost always needed to capture motion picture scenes. Different cameras, whether film (analog) or digital cameras, often capture the same scene in slightly different colors and intensities. In film cameras, such differences often arise because of difference in the quality of film used. Different results may even be obtained from film of the same type, when from different manufacturing lots. Other camera parameters may also create differences in the colors and intensities recorded by the camera. Digital cameras may also show different responses to the same image. Because of differences such as these, images gathered from the scene may record different colors and intensities. In addition, each camera used to gather extended dynamic-range ("XDR") images for image-based lighting may have its own characteristics different from those of the motion picture cameras. Thus, when imported image data from more than one camera is used in a digital representation, colors often do not match, requiring manual touch-up or resulting in a poor quality image. It is therefore desirable to provide a method for automatically correcting colors of image data imported from multiple sources.

Another limitation is encountered when rendering a digital object that moves around a scene. It is not uncommon for lighting to vary substantially across a screen. For example, an actor standing next to a red brick wall will be lighted differently than when in the middle of a black asphalt road in the same scene. If the actor is digitally rendered, he will not appear realistic if lighting data gathered adjacent to the red wall is used for rendering the actor when in the road. Also, as the digitally-rendered actor moves from the red wall to the black road, his appearance should change gradually, and not in noticeable increments. At the same time, gathering lighting data at closely spaced intervals across a set to avoid noticeable lighting changes may be extremely time-consuming. Managing and rendering the very large quantity of lighting data that would result may also be cumbersome. It is therefore also desirable to implement an image-based lighting scheme that minimizes the need for gathering lighting data across a set, while still rendering digital objects in a realistic and gradually-changing fashion commensurate with object motion.

SUMMARY OF THE INVENTION

The present invention provides methods for implementing a reality-based lighting environment for digital imaging in motion pictures, that overcome the limitations of the prior art. As used herein, "motion pictures" are not limited to film productions, and includes any visual depiction of motion in any media, regardless of purpose or length.

According to an aspect of the invention, a "color space" for digitized images is standardized to ensure consistent coloring for objects that are captured using different cameras. The color space may include high-dynamic range images used for image-based lighting, as well as other images used for production. In an initial step, the characteristics of each camera are defined by capturing an image of an object having a known color value. The image is captured in a known lighting environment (preferably a pure white daylight or tungsten environment). It is convenient to use a "gray ramp," which is a gray scale scaled in increments from white to black (gray having equal values of red, green, and blue) as the standard object. For a given lighting environment, the assumed known appearance of the gray ramp is compared to the image of the gray ramp as captured by the camera. Any differences are quantified as to color values (e.g., red, green, and blue) and brightness, and a color correction algorithm is developed for each camera. Thereafter, before images from a camera are entered into the image database of a project, they may be color and intensity corrected using the developed algorithm. In the alternative, images may be stored as raw data, and corrected as needed before being used in production. For film cameras, the characteristics of each film batch may be determined and corrected for in the same way. Hence, an imaging project may be stocked with images having consistent and accurate color and intensity values, whether the images originate from film, or from digital cameras.

Providing a standardized color space for images from multiple cameras is advantageous in several ways. Digitally modeled objects may be rendered in the ambient light of the set, and the coloring of the rendered objects will be consistent with the coloring of the set as recorded by any of the cameras. In addition, background images from any of the cameras may be used together as desired, and images from different cameras may combined, without risk of introducing color inconsistencies into the image.

To permit rendering of digitally modeled objects in the ambient light of the set, the lighting environment of the set may be captured, including the dynamic range of the environment, using a high dynamic-range imaging technique (image-based lighting) as known in the art. In an embodiment of the invention, each camera is used to capture an image of a mirrored reflecting ball (i.e. "chrome ball") placed in a scene of interest, at one or more locations for which the camera will be providing image data. The image of the chrome ball provides a nearly 360° panoramic view of the lighting environment that surrounds each location of interest. The chrome ball is captured at multiple exposures using different exposure levels to create a sequence of images that captures the entire dynamic range of the lighting environment. The image sequence is then processed in an automated fashion to generate lights within a 3-D modeling and rendering software application. The lighting environment for a particular set under specified lighting conditions is thus digitally recreated, by which digital objects are rendered for seamless integration into a recorded scene.

In general, the lighting environment varies across different locations in the set. Therefore, as an object moves around a set, its appearance should change to reflect the lighting environment of its current location. Lighting may also change noticeably with time. This may occur in natural light in accelerated time, and even at normal time when in the vicinity of brightly-lighted moving objects, or lights with changing luminance. For example, night lighting at an amusement park may vary in a oscillating fashion with the movement of the carnival equipment. Prior-art imaging methods have not adequately accounted for local lighting variations, as such variations that affect moving objects or changing lighting. Therefore, according to an aspect of the invention, the image-based lighting method is adapted for realistic rendering of digitally-created moving objects and/or objects in lighting that changes with time.

In an embodiment of the invention, the lighting environment is captured at one or more locations of the set, or at different times within a regularly changing light environment, to create one or more corresponding high dynamic-range panoramas. At least one panorama is processed to identify key lights (for example, the sun or stage lighting). Generally, multiple panoramas are processed to provide lighting data for different locations on the set, or different times of a lighting sequence. Geometric and camera parameters associated with each panorama are used to automatically generate a model of the visible key lights. Any suitable light source model may be used. Color and intensity of the key lights may be accurately determined by calibrating the images used for constructing the panorama. After the key lights are modeled, the associated bright areas of the panorama may be subtracted or masked to leave a relatively dim, lower dynamic-range panorama, which is used to model "fill" lighting in subsequent steps.

In an embodiment of the invention, the remaining panorama may then be segmented to any desired level of granularity. A plurality of fill lights are then modeled using the color and intensity of each granular region. Any suitable model may be used for modeling the fill lights. Each modeled fill light may comprise a directional light, positioned to illuminate the rendered object with a color, intensity, and beam direction calculated from the panorama. As used herein, a "directional light" refers to a light that has an associated beam direction, and whose intensity does not drop off with distance. Conceptually, a directional light has properties of a light that is placed an infinite distance away. The modeled fill lights and key lights may then be applied to render a digital object to be inserted in the scene at the position where the panorama data was gathered.

For objects located at a position or time for which no panorama exists, an object-specific panorama may be calculated by interpolating from panoramas taken at adjacent positions. Weights for interpolation may be assigned based on each panorama's proximity to the rendered object location, and each panorama's proximity to each other. Advantageously, an object-specific panorama may be interpolated very rapidly, and there is no need to create a three-dimensional model of the set. Disadvantageously, an interpolated panorama provides an approximation of lighting at an intermediate position, with various degrees of error arising from the interpolation process. Thus, interpolation may not be accurate enough for some rendering applications. For those applications in which the interpolated panorama achieves sufficiently realistic results, a set of modeled fill lights may be developed from the object-specific panorama, in the same way as for a directly-imaged panorama. For moving objects, the foregoing process may be repeated at each frame or key frame along the objects' path of motion.

In an alternative embodiment, a rough digital model of the set may be created that defines the location and shape of objects that are large enough to appreciably affect the lighting environment. The modeled key lights may be incorporated into this model. Panoramas taken from -within the set are used to project texture (color and intensity patterns) onto surfaces in the model. This need only be performed once, assuming the light environment in the set is relatively constant. In the alternative, for time-variable lighting, additional models may be generated to model the set lighting at different instants of time. The model of the set with the projected surface textures is used to determine parameter values for a new light primitive that may be used to model fill lighting anywhere in the set and/or at anytime.

The area of the new light primitive may be dynamically subdivided for each object it will light. This light fulfills the criteria that none of its sub-regions may exceed a solid angle threshold relative to the an object being lit. This criteria may be satisfied in various ways. For example, when rendering a given object at any given location within the set, each surface of the model may be considered in succession. If the current piece exceeds a predetermined threshold in terms of its projected area relative to the object, it may be subdivided and its sub-portions are returned to a list of pieces being considered for subdivision. This process may continue until a user specified number of pieces have been generated which would cover at least the visible portion of the lighting environment, or all of the environment is considered and no more subdivision is necessary. In the alternative, the light primitive may be subdivided in any other suitable manner.

The colors and intensities recorded in the model are averaged over each of the pieces of the model remaining in the list to determine a color and intensity for each subdivision of the fill lighting primitive. Each subdivision may model a directional light directed at the object to be rendered. The position, orientation, and shape of each subdivision is determined by the set model. The new light primitive may then be used with the modeled key lights to render the digital object. The process may be repeated for any subsequent frame showing a rendered object in the set.

A more complete understanding of the methods according to the present invention will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a flow chart showing exemplary steps for building an image database in a uniform color space according to an embodiment of the invention.

FIGS. 2A and 2B are block diagrams each representing an exemplary system resulting from the method shown in FIG. 1.

DETAILED DESCRIPTION OF THE PREFERRED EMBODIMENTS

Figure 3:
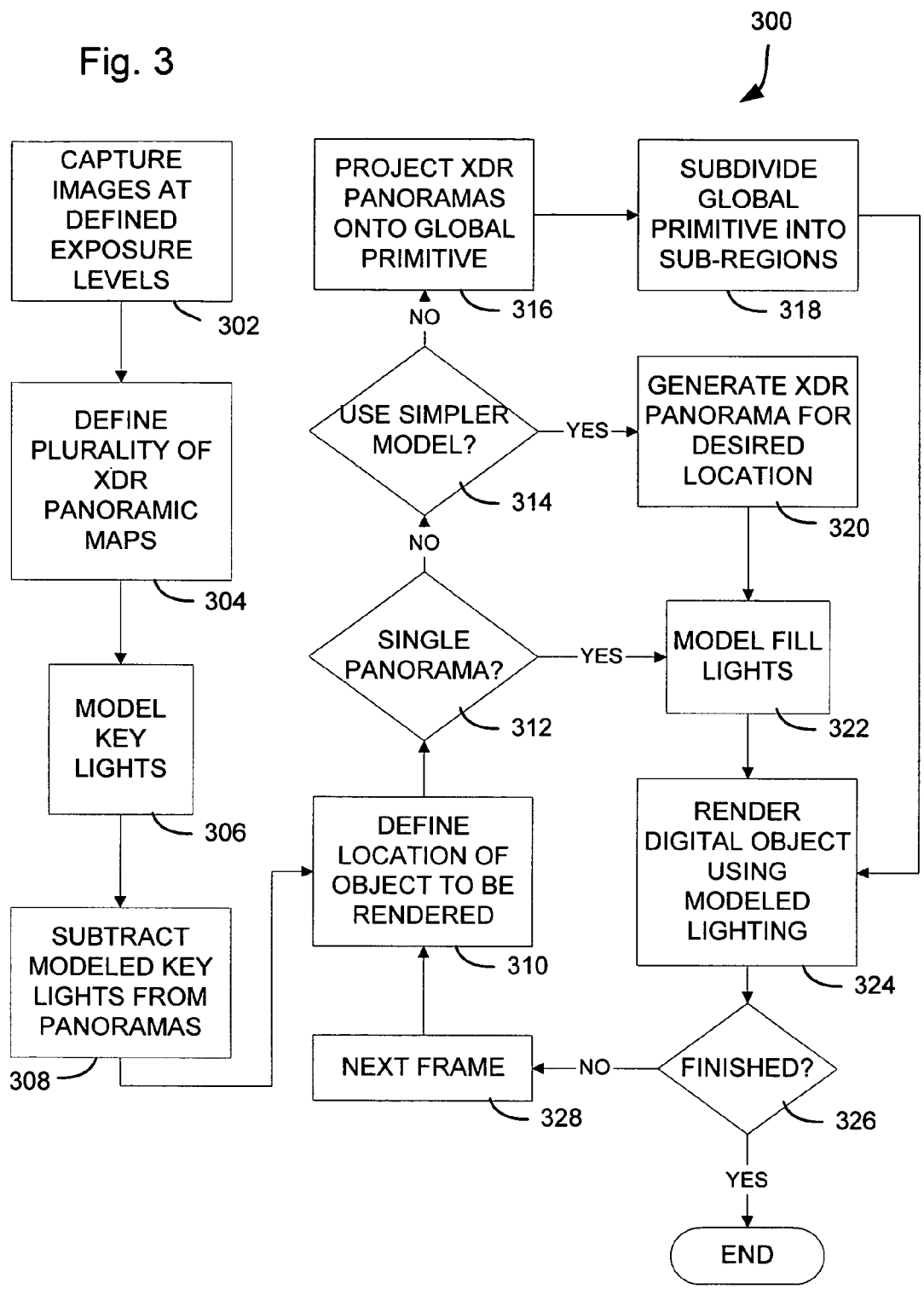
FIG. 3 is a flow chart showing exemplary steps for implementing reality-based lighting for digital imaging in motion pictures, according to embodiments of the invention.

The present invention may be embodied in various different ways, depending on the desired results, resource constraints, and perhaps other factors. In the detailed description that follows, a limited number of exemplary embodiments are described, from which one of ordinary skill in the art may develop other embodiments of the invention. Like element numerals are used to denote like elements appearing in one or more of the figures.

According to an aspect of the invention, a motion picture project involving insertion of digitally rendered objects into real scenes draws data from images collected using different cameras, including both digital and film cameras. Different cameras usually record slightly different colors when exposed to the same scene. For example, different rolls of film, even from the same manufacturer, often will record slightly different colors. According to an aspect of the invention, the collected images are color and intensity corrected so that color differences arising from the use of different cameras are eliminated. Hence, the digital imaging is based on a uniform "color space."

FIG. 1 shows exemplary steps of a method 100 for building an image database and/or an XDR panorama in a uniform color space, according to an embodiment of the invention. At step 102, each camera of the system is individually characterized. Cameras may be characterized by imaging a standard color object (e.g., a Kodak™ 20-step "gray ramp" and/or a Macbeth™ ColorChecker™ chart) using the device, and then comparing the image of the standard object with its assumed standard color and intensity, as indicated at steps 104 and 108. For XDR imaging, characterization may be done at different exposure levels, as the color response of the device may vary depending on the exposure level.

Other characteristics of individual cameras and of images captured by them may include, for example, film color temperatures, exposure settings, camera geometry (focal length, etc.), camera position and orientation, time, date, and any other relevant identifying information. At step 106, these parameters may be recorded in association with image data from a particular set. A "set" in this context refers to a defined physical space used for performing one or more scenes of a motion picture. Image data may include production images, photogrammetry reference images, color calibration reference images, and XDR images. To the extent it is not already in digital form, image data may be digitized and stored in digital form for use in digital editing and imaging. Any suitable digital format may be used. For example, analog film images used for extended dynamic-range images may be scanned into a digital format suitable for high-dynamic range imagery, for example, floating-point TIFF (.tif) or IFF (.iff) format.

At step 108, images of the defined reference object are analyzed to determine a correction factor applicable to each camera. Separate correction factors may be developed for images captured at different exposure levels, using different film types, or having other image-specific characteristics. Methods for color and intensity correction are known in the art. Any suitable method may be used. Image data is often provided in a Red-Green-Blue ("RGB") format, in which each pixel is associated with a numeric red, green and blue values, together with a brightness or intensity value for each RGB value, or one value for all three RGB values. For such data formats, for example, a correction table (matrix) may be developed for each camera, for each exposure level of interest. An exemplary table may appear as follows:

| Red | 1.00129 |
|---|---|
| Green | 0.98657 |
| Blue | 1.00546 |

The value in the leftmost column indicates the color value. The next column indicates a correction factor for the corresponding color. In the example above, the "Red" value of images from the camera would be increased by a factor of 1.00129 (0.129%), while green would be decreased by 1.343% and blue increased by 0.546%. Additional columns may be added for other exposure levels, and additional rows may be added for other color values, as desired. In addition, a separate brightness correction factor may be developed and applied to an intensity exponent or other intensity value.

At step 110, images from the camera may be corrected according to its characterization table. Typically, this involves scaling the RGB values for each pixel as exemplified above. Corrected images may be stored in a database for use in production. Raw (uncorrected) images may also be stored for archival purposes. The corrected images may be used together in production, without apparent differences in image coloration or intensity. Furthermore, the corrected XDR images provide a basis for more accurate reality-based lighting in rendering digital objects for insertion into the corrected real images.

At step 112, one or more XDR panoramas may be constructed from the corrected XDR images taken from the set. A separate panorama should be constructed for representative areas of the set, or at representative times during a changing light environment. For each panorama, a sequence of XDR images should be taken at the desired set location and/or at the desired time. The constructed panoramas may be used to provide baseline data for reality-based imaging as described later in the specification. Any suitable method for capturing an XDR sequence and generating a panorama from it may be used, as known in the art. Further description of XDR image sets is provided below, in connection with FIG. 3.

The location and number of locations from which to gather XDR image sequences should be selected to achieve the required level of accuracy in the reality-based lighting model, at minimum cost. A greater number of panoramas may provide more accurate results, but will require additional time and expense to capture and process the required XDR image sequences. The number of different XDR sequences will vary depending on the application. For many applications, a relatively small number of XDR sequences, for example, less than ten, may suffice.

FIG. 2A shows exemplary elements of a system 200 resulting from method 100. The system includes "n" number of cameras, e.g., 202–204. It should be appreciated that different rolls (or batches) of film from the same analog camera may constitute different "cameras" for purposes of system 200. Output from each camera is corrected using "n" number of corresponding correction matrices 212–214. Corrected image data is accepted into image database 220. In addition, or in the alternative, raw image data may be archived in a database 270, as in system 250 shown in FIG. 2B. Raw image data from a plurality of cameras, e.g., devices 252–254 is maintained in database 270. Corresponding correction matrices 262–264 may be applied to process raw image data as needed. Corrected image data may be stored separately for use in production or reality-based lighting.

Baseline XDR panoramas may provide input data for a reality-based lighting method. Exemplary steps of a method 300 for implementing a reality-based lighting method for digital imaging in motion pictures are shown in FIG. 3. Steps of method 300 may be carried out in an automated fashion.

For each set location for which the lighting environment is to be defined, a set of XDR images are captured, as indicated at step 302. Each sequence of XDR images corresponds to a unique coordinate within the set, such as to a location coordinate or to a time coordinate, captured at defined increments of exposure. Once the set locations are defined and suitable capture equipment set up, most remaining steps of method 800 may be performed in an automated or semi-automated fashion.

To capture the light environment, and as is known in the art, a mirror-finish sphere or hemisphere (i.e, a "ball"), or any other suitable concave surface, can be placed at the location for which reality-based lighting data is to be gathered. Images of the ball may then be captured at the defined exposure increments. As known in the art, the camera may be positioned so that the image of the ball provides an almost 360° panoramic view of the light environment surrounding the ball, except for a comparatively small obscured region that is directly behind the ball from the point of view of the camera. Preferably, the ball and camera should be positioned so that the ball does not obscure any lights or particularly bright areas of the set. In such case, the obscured region will not contain information that is needed to create a sufficiently accurate model of the light environment.

The mirrored ball may comprise a chromed metal ball, such as a large ball bearing, a mirrored glass ball, or any other suitable reflecting shape. Other shapes of mirrors may be used, if desired. In the alternative, a rotating camera may be set at the location of interest, for example, a scanning panoramic camera available from Spheron™ may be used instead of a chrome ball. A rotating camera may be rotated to capture panoramic images over an almost 360° field of view, around two perpendicular axes.

To capture the full dynamic range of the light environment, the mirrored ball may be photographed over a range of exposures, from almost totally underexposed (so that the entire image is black) to almost totally overexposed (so that the entire image is white). Exposures may be set an f-stop apart. The resulting sequence of images captures at least a portion of the dynamic range of the light environment, from the darkest object to the brightest. This dynamic range may easily be on the order of a million or more (i.e., the brightest object being more than a million times brighter than the darkest object), which cannot be captured using a single exposure. The process of capturing images at multiple exposure levels and processing them to digitally recreate the light environment over an extended intensity range is sometimes referred to as "extended dynamic range imagery," or "XDR imagery." It may also be referred to as "image-based lighting." Various methods of XDR imagery are know in the art, and may be applied in the practice of the present invention.

The local light environment may vary dramatically across a set, or as a function of time. Each sequence of panoramic images records the light environment at a particular location and time. Accordingly, step 302 should be repeated as needed to accurately record the light environment of the set, for the areas in which digitally rendered objects will be placed. For example, in the interior set shown in FIG. 4A, comprising four walls 432a–d, floor 434, an open ceiling though which stage lighting (not shown) may shine, door opening 436, windows 438a–c, desk 440, desk lamp 442, and floor lamp 444, may have dramatically different local light environments at the positions 446a–d, respectively. Set 430 and positions 446a–d are shown in plan view in FIG. 4B. A digitally rendered image of a person moving along path 448 from a seated position at desk 440, past windows 438a–c, to a corner of the set near the floor lamp 444, should reflect the changing light environments at each position along path 448. Accordingly, it may be desirable to collect an XDR sequence of panoramic images at each location 446a–c. The locations should be positioned at selected differently-lighted areas of the set, depending on available resources and the desired level of accuracy. In addition, or in the alternative, if the light environment varies with time, step 302 may also be repeated at representative times of a varying light sequence.

A resulting sequence of XDR images from each location may then be automatically processed at step 304 to define a plurality of XDR panoramic maps. The plurality of panoramic maps may comprise a digital light environment database for the set. If not already in a digital format, each image in the XDR sequence may be converted to a suitable digital format, such as by scanning. Then, for each location, starting with the shortest exposure image of the series (wherein most of the image is dark), the color and intensity shown of each area of the image is recorded. Each area may correlate to an area of any size, but for the highest possible resolution, is not larger than a pixel of the digital image. The light intensity is scaled by a factor inversely related to the exposure time. Color and intensity are analyzed at each exposure level, until each image area is assigned an intensity and color value.

Discrepancies between exposure levels may be handled in different ways. For example, a weighted average intensity calculated from the range of photographs may be assigned to each pixel. For any given exposure, pixels will range from a darkest vale to a lightest value. A midpoint of this range may be determined, and each pixel may be weighted in inverse proportion to its distance from the midpoint: those pixels having having values closest to the midpoint may be weighted most heavily, while those with values closer to either end of the range may be weighted less heavily. Over a series of images at different exposure levels, those values from images in which the pixel was nearer a mean or median intensity value may therefore be weighted more heavily.

Similarly, color values should be calculated so as to properly account for darkening that occurs in underexposed areas, and washout that occurs in overexposed areas. Color and intensity values may also be automatically corrected as described above in connection with FIG. 1. For each location, imaging parameters are also recorded so that the calculated color and intensity values of a sequence of images can be transformed into a light environment. For example, the camera position, aperture size, focal length, mirror ball size, position within the set, set identifier, and so forth, are recorded.

Using these geometric and optical parameters, the XDR data gathered from the XDR images of the chrome ball or other suitable images may be mapped to a panoramic map of the environment surrounding the XDR imaging location. Various methods are known in the art for mapping a three-dimensional environment (e.g., the surface of the chrome ball) to a two-dimensional map. For example, Spherical, Cubic, and Angular panoramas are known in computer graphics. Any suitable mapping method may be used. The resulting map is referred to herein as a panorama or panoramic map. It is not a projection of a three-dimensional model of the physical set, although it may resemble a projection in some respects. Instead, a panoramic map is a projection of an imaging surface, for example a chrome ball surface, into a two-dimensional space, such that a defined correspondence exists between pixel location within the panorama and viewing direction in a three-dimensional environment. A plurality of such panoramic maps may be stored for later use in digital modeling.

Figure 5A:
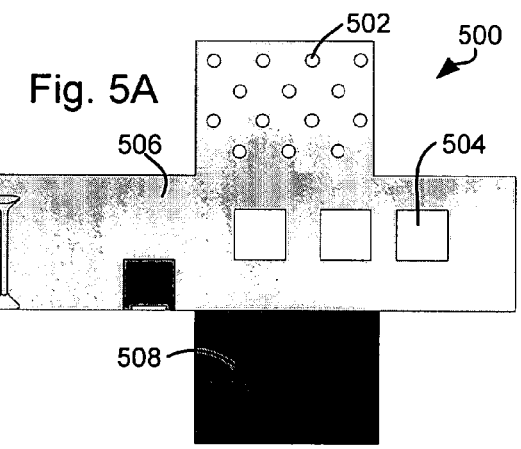
FIG. 5A is a diagram showing an exemplary panorama for use in image-based lighting.

Referring to FIG. 5A, an exemplary although greatly simplified panoramic map 500 of set 430 comprises luminous areas such as stage light image 502 and "window light" image 504, and non-luminous areas such as wall area 506 and floor area 508. It is not possible to accurately illustrate the extended dynamic range of a panoramic map on paper. It should be appreciated that FIG. 5A merely represents an exemplary panorama for conceptual purposes, and does not represent an image of an actual panorama. Panoramic map 500, like any other two-dimensional map, contains a limited amount of information about relative positions of luminous and non-luminous surfaces in the set. By itself, however, a panoramic map such as map 500 does not contain sufficient information from which the three-dimensional structure of a set may be reconstructed. In particular, it generally will not contain complete information about the distance of luminous and non-luminous surfaces from the image center. Such information may be calculated from assumptions about surface shapes, camera positions, and other photogrammetry data, but is not inherent in the map itself.

For any given set, it may be advantageous to model a set of "key" lights for discrete stage and/or natural light sources in the set, as indicated at step 306 of FIG. 3. In any given panoramic map, luminous areas typically have a much higher intensity than non-luminous areas, and may readily be identified by filtering for pixels of lesser (or greater) luminance than a threshold intensity. Each luminous area may be processed as a modeled key light. The three-dimensional location of each modeled key light may also be determined from one or more panoramic maps, using the principles of photogrammetry and/or diagrams of the set. It is therefore a relatively straightforward matter to model a collection of key lights for the set from the panoramic images and other data for the physical set. For example, key lighting may be modeled at the positions indicated in a set diagram, with color and intensity calculated from the panoramic map. In the alternative, or in addition, one or more panoramic maps or other images of the set may by analyzed using principles of photogrammetry to determine the positions and sizes of the key lights, with color and intensity again determined from the XDR panorama. Using computing methods as known in the art, the entire process of building a key lighting model from the XDR images and related set data may be automated. The resulting key lighting may encompass all areas of the set.

Traditionally in the motion picture arts, "key lighting" refers to the principle lighting for a set, while "fill lighting" refers to secondary lighting such as used for filling in shadows or bringing out a desired coloration. Both of these types of lighting may be supplied using physical lights. Diffuse reflectors are sometimes used for fill lighting. However, in the context of digital imaging, and as used herein, a modeled key light refers to any modeled light source of greater than a threshold luminosity, regardless of its purpose on the set. For example, what a stage lighting technician may refer to as a fill light may be regarded as a key light for digital imaging purposes, so long as its luminosity exceeds the threshold established for imaging purposes. At the same time, what is called a modeled "fill light" herein in the context of digital imaging may have no counterpart on the physical set. In the digital imaging context and as used herein, modeled fill lights may be used for reflected light from any non-luminous surface of the set. Such non-luminous surfaces are often not considered "lights" at all, in the parlance of the lighting technician.

Figure 4A:
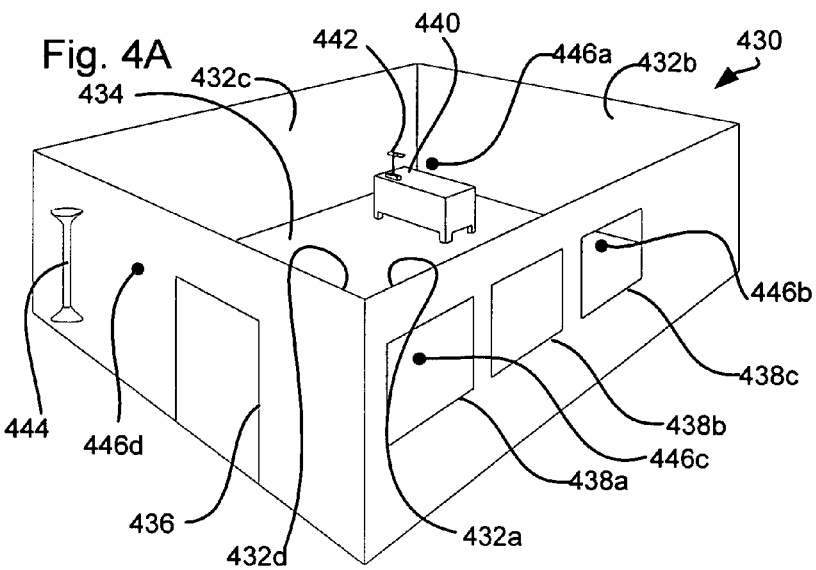
FIG. 4A is a perspective view of an exemplary set for implementing an embodiment of the invention.
Figure 4B:
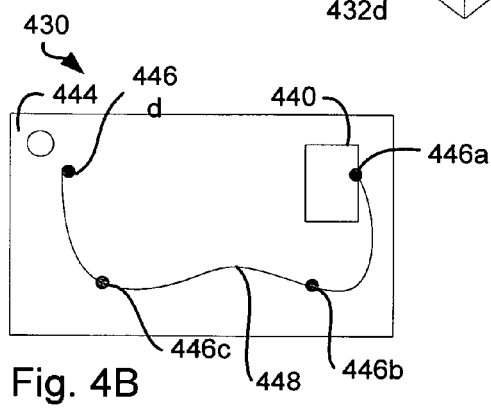
FIG. 4B is a plan view of the set shown in FIG. 4A.

For example, with reference to FIG. 4A, panoramic maps defined using XDR image sequences from locations 446a–d may be processed to identify light sources in set 430. Such sources may include windows 438a–c (or stage lighting placed outside of the windows), desk lamp 442, floor lamp 444, and any stage lighting placed above set 430 or elsewhere in relation to the set. All of these sources, regardless of their purpose on the set, may be modeled as key lights for digital imaging purposes. A key light model may be provided in any suitable form. For example, a modeled key light may include definitions of RGB luminance values, a luminous surface geometry, a beam direction, a cone angle, and a position. Any light source model that models the actual set lighting may be used, including but not limited to electric lights such as are used for most stage lighting, and natural sources such as the sun.

Referring again to FIG. 3, after the key lights for the set have been modeled, the luminous areas corresponding to the key lights may be subtracted from the XDR panoramas to create corresponding fill light panoramas, as indicated at step 308. Again, this may readily be accomplished by filtering out luminous areas that exceed the designated intensity threshold.

In the exemplary sequence of method 300, the process steps 302–308 have concerned gathering and processing image and lighting data that concerns the set as a whole. At step 310, a process of using this data for rendering one or more digital objects at a defined position in the set begins. It should be apparent that the sequence of steps need not be performed in this order; for example, step 310 may be performed before any of steps 302–308.

At step 310, a location of the object to be rendered is identified, such as from an animation plan for the digital object. Along with the object position, the desired view and other imaging parameters may also be defined. Once the object position is defined, alternative processes for determining a reality-based light environment for use in rendering the object may be employed. Three exemplary alternative processes are diagrammed in FIG. 3, as the three branches off of decision steps 312 and 314. At step 312, the method may branch to a process for rendering the digital object using a single XDR panorama. This may be appropriate, for example, if the digital object is to be positioned at, or closely adjacent to, one of the XDR sampling points. For example, if an object is to be rendered at any of positions 446a–d in set 430, then a set of modeled fill lights may be defined directly from a single panorama corresponding to the object's position.

At step 322, a set of fill lights are modeled from the fill light panorama described in connection with step 308. The fill light panorama need not be a discrete data object; rather, it may be regarded as that portion of an XDR panorama that does not represent key lights. For example, if key lights are not separately modeled, the fill light panorama will be the same as the original panorama.

In an embodiment of the invention, the modeling of fill lights as exemplified at step 322 balances accuracy and computational speed to produce an approximation of the low-intensity light environment at the imaging location. In many circumstances, the final rendered result depends most heavily on the key lighting, so a high degree of accuracy in the fill lighting model will often not be necessary. Thus, a substantial degree of mathematical accuracy may often be sacrificed in favor of computational speed, without noticeably affecting the realistic appearance of the final result.

One method of performing a suitable approximation is to simply divide the fill light panorama into regions of equal area or equal luminance. Each region may then be modeled as a directional light pointed at the object to be rendered, and a color and intensity computed by integrating over each region. Each modeled fill light may comprise a standard form of light primitive or other data object, suitable for use in generally-available standard rendering programs.

Various different methods may be used for subdividing a panorama. For example, another approach may be to divide the projection surface into segments of equal area, such as, for example, each representing 0.1% of the total area. An advantage of this approach is that the light environment at different positions in the set may readily be compared, such as for purposes of interpolating between locations. For each subdivision, the average color and intensity of the light environment over the subdivision area may be calculated. For example, if half of a subdivision area has an intensity value of zero, and the segment's other half has an intensity value of 1000, the average intensity for the subdivision will be 500. The average color, intensity, and position of each subdivision may be recorded in a list or other database for later use in rendering.

Another subdividing method suitable for creating a light environment list considers the integral of light intensity over a subdivision area (i.e., light flux) as the basis for subdivision. Subdivisions are defined so as to each have less than a certain specified maximum light flux. An advantage to this approach may be that each subdivision corresponds to an approximately equal amount of light as every other subdivision. Yet another method may be comprise analyzing the panorama to identify areas of similar coloring. Each area may then be further subdivided until every region is less than a specified maximum area. One of ordinary skill in the art may devise other suitable subdivision methods for use with the invention, based on the disclosure herein.

As previously mentioned, a single panorama does not directly indicate the distance between each surface of the set and the imaging center. But when fill lights are modeled as directional lights, for which distance from the illuminated object is immaterial, the relative distances of the fill light is not needed. This approach simplifies computation, and should provide adequate results for most applications.

In the alternative, but less preferably, a distance between each modeled fill light and the object to be rendered, i.e., the modeled fill light position, may be estimated. For example, an estimate may be made from the set diagram and/or using principles of photogrammetry, or a modeled fill light position may simply be assigned based on some easily ascertainable parameter, such as the largest dimension of the object to be rendered. For example, each modeled light may be placed a distance of twice the largest object dimension away from the object centroid, which may be placed at the imaging center. This approach may result in slightly more accurate fill lighting, but at the cost of considerably higher computational complexity.

Figure 5B:
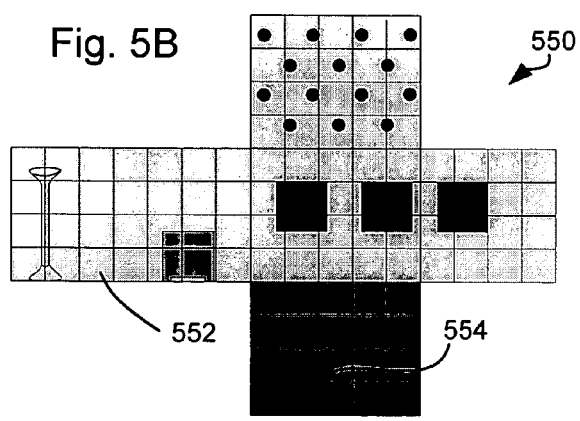
FIG. 5B is a diagram showing the panorama of FIG. 5A with key lighting removed and the remaining area divided into regions of equal area.
Figure 5C:
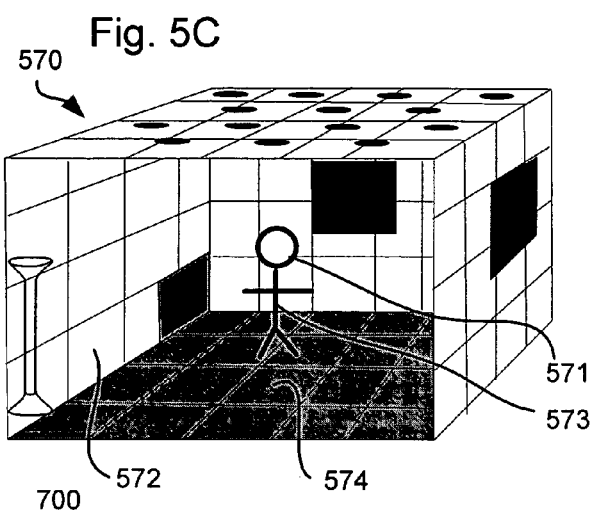
FIG. 5C shows an exemplary arrangement of modeled fill lights.

Further illustration of modeling fill lighting as a collection of directional lights is provided by FIGS. 5B and 5C. FIG. 5B represents a fill light panorama 550, derived from XDR panorama 500 with luminous areas removed. FIG. 5C represents an array of modeled fill lights 570 based on panorama 550 arrayed around a digital object 572 to be rendered. Like FIG. 5A, FIGS. 5B and 5C are conceptual diagrams, and should not be understood as depicting a typical panoramic map or modeled light array.

As previously described, panorama 550 may be subdivided into a plurality of regions, such as regions 552 and 554. The regions may be of any desired size. A modeled fill light may be developed for each region, so computational efficiency is enhanced by maximizing the region size to the extent possible, without causing any noticeably unrealistic effects in the rendered object. There is no single "optimal" size, because the optimal choice will vary depending on the circumstances. While FIG. 5B shows subdivisions in the form of a rectangular grid for illustrative simplicity, any suitable method of subdividing the panorama, for example any of those previously described, may be used.

Each subdivision may then be integrated over to determine an intensity and color for each modeled fill light. The modeled fill lights may then be arrayed around the object in a manner that approximates the environment of the set. For example, FIG. 5C shows an array of modeled fill lights 570 around a digital object 571. A proximal portion of array 570 is not shown in FIG. 5C, to permit a view of the interior of the array. Array 570 only roughly approximates the low-intensity light environment of set 430, shown in FIG. 4A. An aspect of this approximation is the cubic form of the array, edges of which may not correspond with edges of walls 432a–d. To the extent that the cube edges introduce noticeable anomalies, these may be smoothed over by modeling array 570 along a closed curve, for example, a sphere or ellipsoid.

Preferably, each modeled light in the array 570 is modeled as a directional light, for which light direction and intensity are defined, and do not vary with distance from the illuminated object. In such case, the array of directional lights does not correspond to a specific geometric surface, such as the depicted cube. Instead, the array merely comprises a list of directional lights, all directed at the object to be rendered. The intensity of each directional light may be computed by integrating over each corresponding subdivision of panorama 5B. The direction of each light may likewise be determined by selecting a suitable point of each subdivision, for example, the centroid. By definition, each pixel or point of a panorama corresponds to a three-dimensional view direction determined by the applicable mapping. Thus, the direction of the light may simply be equated to the three-dimensional view direction corresponding to the selected point. Because directional lights are used, there is no reason to define a distance between the modeled light and the object to be rendered.

In the alternative, but less preferably, each modeled light in the array 570 may be modeled as a luminous surface having the shape of a corresponding subdivided area of panorama 550, set a defined distance away from the object to be rendered. For example, modeled fill light 574 may have a shape, coloring, and luminosity corresponding to region 554 of panorama 550. Likewise, modeled light 572 may correspond to region 552, and so forth. In the alternative to modeling each fill light having the shape of its corresponding panorama region, each modeled fill light may be assigned an arbitrary shape. Digital object 571 may be located so its centroid 573 is at the imaging location.

The foregoing examples illustrate that the key and fill lights for a given location on the set may be automatically modeled as standard data objects—e.g., "light primitives"—by applying computationally simple algorithms. Referring again to FIG. 3, in a subsequent rendering step 324, the digital object may be rendered using any suitable method as known in the art, based on the viewpoint, digital object geometry and position, and global light environment. The result is a rendered digital object that may be seamlessly placed within the scene at its designated location, using any suitable method know in the art. As indicated by steps 326 and 328, the modeling and rendering branches of method 300 may be repeated any desired number of times for successive frames of the motion picture. It should be apparent, however, that the fill lights need not be modeled for every frame, and may instead be modeled at selected frame intervals. For example, it may be decided to create a new fill light model at ten-centimeter increments along a digital object's path. Intermediate frames may be rendered using the nearest available modeled fill lights.

As previously mentioned, it may be desirable to render a digital object positioned relatively far from an XDR imaged location, so that no single panorama closely represents an accurate light environment. In such case, referring again to step 312, the method may branch to an alternative branch. As indicated at step 314, there are at least two alternative resolutions to this problems, depending on whether a more simplified, computationally fast solution is desired, or a somewhat more complex but more accurate solution.

One simpler approach may comprise interpolating an intermediate, "object-specific" panorama from two or more adjacent panoramas, as indicated at step 320. The interpolation may weight adjacent panoramas according to their distance from the desired rendering location and their distance from each other. Panoramas that are closer to the rendering location should be more heavily weighted, while at the same time panoramas should be reduced in weight in inverse proportion to their distance from each other.

The panoramas may then be combined to generate an object-specific panorama by assigning RGB color and intensity values to each pixel, as calculated by interpolating from corresponding pixels of the adjacent fill light panoramas. The object-specific panorama may then be used to generate an array of modeled fill lights at step 322, in any suitable manner as previously described. It should be apparent that an object-specific panorama derived by interpolating between pixels of adjacent panoramic maps will naturally contain numerous geometric errors. However, so long as the adjacent panoramas from which it is generated are not too distant from one another, these errors will tend to be small enough to be obscured in the final rendered result. Therefore, the desired effect of achieving a realistic fill lighting that gradually changes as an object is moved from place to place may often be achieved using step 320. The accuracy of this method may be increased by gathering XDR image sequences at additional locations within the set.

Figure 6:
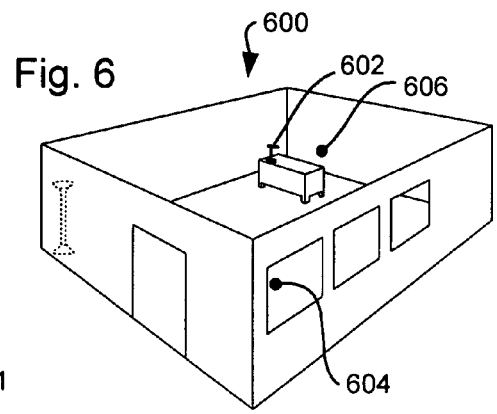
FIG. 6 shows an exemplary model of the set shown in FIG. 4A.

In the alternative, it may be desirable to achieve more accurate rendering results without increasing XDR sampling beyond what is minimally necessary. In an embodiment of the invention, this alternative process may begin at a three-dimensional modeling and projection step 316. This step includes constructing a three-dimensional model of the set. For example, FIG. 6 shows a representation of an exemplary 3D model 600 of set 430. Various modeling methods are known in the art, and any suitable method may be used to construct the model. For example, a suitable model may already be available from the set designer, if the set was designed using a three-dimensional design tool. In the alternative, a model may be manually constructed by a computer graphics designer, based on a diagram of the set. In the alternative, or in addition, a 3D model may be generated automatically or semi-automatically using photogrammetry as applied to different images of the set. The 3D model, such as model 600, need not be highly accurate, because it need not actually appear in the final rendering. Instead, the model may be used to define light-emitting surfaces of a new light primitive. Hence, it should be sufficient to model major surfaces that will be reflecting light on a digital object to be rendered. Generally, it should be relatively inexpensive to construct a model of sufficient detail and accuracy. If a detailed and accurate model of the set has been constructed for other reasons, it may be adopted for use as the light primitive.

After the 3D model has been designed, the fill light panoramas generated at step 308 may be used to project the colors recorded on the set onto the corresponding surfaces of the 3D model. Surfaces of the model may be assigned color and light intensity values by "projecting" the light and intensity values from the light environment database onto the surface of the model, using basic geometric and optical principles. It may be convenient to record projected colors as a surface texture, as known in the art. It should be apparent that some surfaces of a model, for example, the inside of a desk drawer or the underside of a table, may not cast noticeable amounts of light on a subject. Color and intensity values need not be assigned to such surfaces, which are insignificant for rendering purposes. Proper selection of sampling locations—that is, locations where XDR image panorama data is gathered—will result in significant surfaces being assigned appropriate color and intensity values.

Surfaces and/or light sources that may be significant for rendering purposes may be obscured by other objects or may be too far away, relative to light environment data collected from a particular location. For example, in model 600, the desk lamp 602 and other objects in its vicinity may be too far away from XDR sampling location 604 to enable a suitably accurate projection of surface coloring. In such case, light environment data collected from an XDR sampling location such as 606 may be used to gather illumination data to this area. At the conclusion of step 316, color and intensity values may be defined for all significant surfaces within a three-dimensional model 600 of the set. This global light environment for the set may be stored for later use in rendering.

Minor errors may arise in the projection because of inaccuracies in the 3D model and/or errors in the geometric information pertaining to each panorama. Such errors may be dealt with in any suitable manner, such as by averaging the color and intensity value from different panoramas, to the extent that projections from different panoramas yields different results. In the alternative, corresponding points in panoramas from adjacent locations in the set may be used to interpolate color values for surfaces of the three-dimensional model, in essentially the same way that adjacent panoramas may be used to interpolate modeled directional fill lights as described above. In general, it may be desirable to minimize errors arising from the projection of surface coloring by making suitable adjustments to the geometric parameters that are used for the projections. It should be apparent that the key lights may be modeled at the same time, using the XDR panoramas, if desired.

The collection of modeled surfaces that comprise the 3D models, together with the color and light intensity that is associated with the surfaces, may then be used as a sort of "global light primitive" for the set. Like conventional light primitives, the global primitive defines a surface geometry for the light source, the color and intensity of the light, its beam direction and cone angle. Color and intensity are derived from projecting the panoramas onto the 3D model geometry. Beam direction may be assumed to be surface-normal. For most diffuse-reflecting materials, the cone angle may be an assumed obtuse angle, for example, 180°. Unlike conventional light primitives, however, the surface geometry can be quite complex, and the light color and intensity (and optionally, beam direction and/or cone angle) may vary as a function of surface location.

Figure 7:
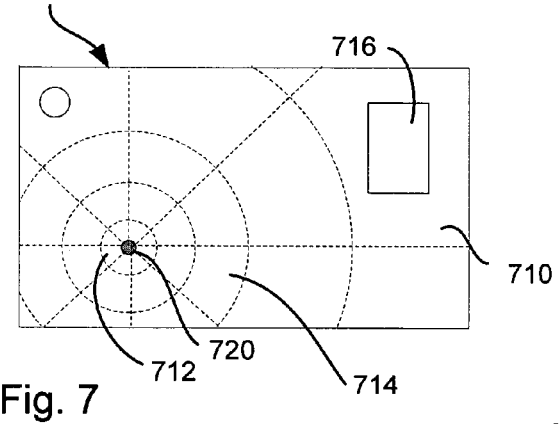
FIG. 7 shows surfaces of the set model subdivided into regions for use in defining a fill light primitive.
Figure 8:
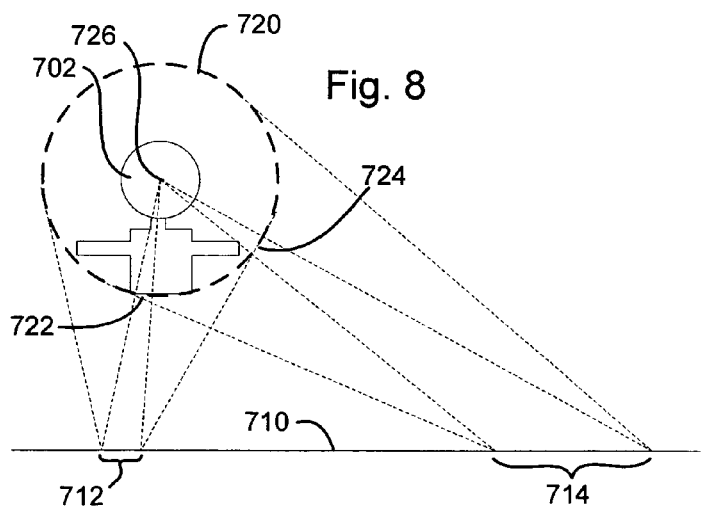
FIG. 8 is a diagram for illustrating the concept of a fill light primitive having regions defined by a solid angle maximum.

Referring again to FIG. 3, at step 318, when rendering a specific frame the global light primitive may be subdivided into areas of similar influence on the final rendered result. This may be accomplished, for example, by subdividing the global light primitive into areas having a defined maximum projection size on an imaginary projection surface surrounding the digital object. FIGS. 7 and 8 may help illustrate this approach. FIG. 7 shows a plan view of a global light primitive 700 modeled after 3D model 600, subdivided into a plurality of areas using a maximum-projection-area method. FIG. 8 diagrams an exemplary relationship between an imaginary projection surface 720 and a global light primitive surface 710, such as may be used to subdivide a global light primitive 700.

Surface 720 may be positioned so as to enclose at least a portion of a digital object 702 within a reference frame of a global light primitive 700. Surface 720 may comprise a spherical surface, or any other defined closed surface. A spherical surface has the useful property of being easy to subdivide into segments, such as by dividing along lines of latitude and longitude. For example, segments 722 and 724 may comprise segments of a spherical surface of equivalent area. A plurality of similar conceptual surface segments may be thought of as surrounding digital object 702. Surface 720 may comprise nothing more than a mathematical construct useful for illustrating a method of the invention, and need not actually exist.

Surface 710 represents a portion of the global light primitive, for example, a floor surface, which is capable of casting light on the digital object. Surface 710, and other surfaces of the global light primitive, may be conceptually segmented by projecting the borders of the conceptual surface 720 segments (e.g., segments 722, 724) from a common origin 726 to the surface 710. Light primitive surface 710 may thereby be divided into plurality of differently-sized segments, each having an approximately equal projected area relative to the digital object. Segments 712 and 714 represent two of such areas. Subdivision of surface 710 are shown in plan view in FIG. 7. Other surfaces of the global light primitive 700 may be divided in similar fashion. Some surfaces of the light primitive, for example, desktop 716, may be smaller than the maximum segment size, however it is defined. Such surfaces may be treated as a subdivided region in their entirety, or as a portion of a region that includes adjacent areas.

Basing the subdivisions on projection areas of equal size exemplifies but one method for subdividing a global light primitive. Any other suitable method may be used, instead. For example, any method described above for subdividing a panorama may be applied to subdividing a global light primitive. Each subdivided region may be defined in any manner that fairly approximates its proportional share of reflected light impinging on the object to be rendered.

After the global light primitive 700 is subdivided, each of its regions may be further processed to define a modeled fill light. In an embodiment of the invention, each region is used to define a directional light directed towards the object to be rendered, having a color and intensity computed by integrating over a projected area normal to the object to be rendered, such as a solid-angle portion of a sphere surrounding the object to be rendered. This approach requires a computation of intensity over a projected surface, but may simplify subsequent computation during rendering.

In the alternative, but less preferably, each region may be used to define a modeled fill light with a position and surface geometry defined by its respective surface region, a beam direction normal to the subdivided region, and an obtuse cone angle. For example, the modeled fill light may be assumed to emit light equally in all non-occluded directions. Color and intensity may be determined by integrating over each surface region, instead of over a projected surface. The intensity of such a modeled light should be adjusted to match the panorama, which because of the non-zero cone angle, varies as a function of distance from the rendered object.

Therefore, referring again to step 318 of FIG. 3, a plurality of modeled fill lights comprise an output of the subdivision process. The plurality of modeled lights may be stored in database or list form for use in any suitable rendering method at step 324, as previously described. The modeling and rendering steps may be repeated for any desired frame of the motion picture, as indicated by the sequence of steps 326, 328, and 310. Repositioning of the object within a subsequent frame drives the generation of an appropriate set of modeled fill lights based on the new object position. Key lights may be assumed constant across the set, or may be remodeled for each new position. It may be desirable to omit light from specularly-reflecting, highly reflective objects from the modeled fill lights and key lights. Approximations that work well for diffuse lighting may not achieve realistic results when applied to specularly-reflecting objects. Instead, these mirror-like objects may be accounted for by inclusion into a digital model during ray-tracing of the desired object. One of ordinary skill may make other appropriate modifications to the methods described above.

Figure 9:
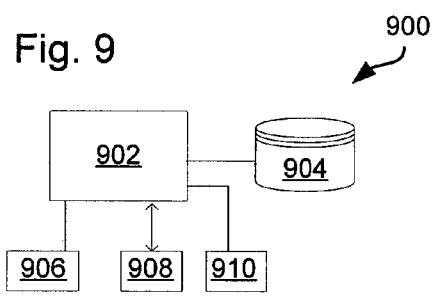
FIG. 9 is a diagram of a system for implementing a method according to the invention.

According to the foregoing, therefore, one of ordinary skill may construct a system for performing a method according to the invention. FIG. 9 shows one such system 900, comprising a computer 902 connected to receive image data from a database 904. System 900 may further comprise a memory 906 operably associated with the computer. Memory 906 may contain coded instructions to enable one of ordinary skill to carry out a method according to the invention. For example, memory 904 may comprise instructions for reading image datasets each corresponding to a unique coordinate within a physical set, each image dataset comprising a plurality of correlated images captured at different exposures. The instructions may further comprise defining a plurality of panoramic maps, each panoramic map comprising a map of color and intensity information derived from images in a corresponding one of the image sets. The instructions may further comprise modeling a dynamic lighting model from the plurality of panoramic maps, the dynamic lighting model defining lighting for digital rendering as a function of virtual coordinates of a modeled space, wherein the modeled space corresponds to the physical set, and the virtual coordinates are selected from the group consisting of space coordinates, time coordinates, and any combination of space and time coordinates.

The instructions may further comprise modeling the dynamic lighting model as a time-independent function, or as a time-dependent function. That is, the modeled light environment may change as a function of position, or of time. The instructions may further comprise reading an image calibration dataset comprising images of a defined reference object linked to an identifier of a camera by which each image was captured, and color-correcting a plurality of images of the limited physical space based on an analysis of images of the defined reference object. The plurality of panoramic maps may be defined using the images of the defined reference object—such as a 20-step gray scale—to determine characteristics of at least one camera. This may help to ensure uniform rendering results, regardless of what source is used to collect the XDR image sequences. The instructions may further comprise modeling at least one modeled key light, and at least one modeled fill light. Modeled lights may be developed by modeling a modeled light-emitting surface—i.e., a global light primitive—surrounding a digital object to be rendered. The instructions may further comprise subdividing the modeled light-emitting surface into surface regions based on a geometric relationship, for example, equal-area projections, between a digital object to be rendered and the modeled light-emitting surface. The instructions may further comprise interpolating an object-specific panorama from the plurality of panoramic maps, from which at least one modeled key light and at least one modeled fill light may be defined. It should be apparent that any of the foregoing program instructions may be contained on a computer-readable media, such as on a removable media 908 or a networked media 910.

Having thus described preferred embodiments of a system and method for defining a reality-based light environment for digital objects in a motion picture, it should be apparent to those skilled in the art that certain advantages of the within system have been achieved. It should also be appreciated that various modifications, adaptations, and alternative embodiments thereof may be made within the scope and spirit of the present invention, as discussed above. For example, particular methods for modeling key and fill lights from XDR panoramic images has been described, but the invention would also apply to other methods of developing modeled lights for rendering from XDR image data. In particular, the invention is not limited to separately-modeled key and fill lights, or to the particular methods for subdividing XDR panoramic data that are disclosed herein. The invention is defined by the appended claims.

What is claimed is:

1. A method for defining lighting for rendering a digital object, the method comprising:
   reading image datasets each corresponding to a substantially different location or a substantially different lighting condition within a limited physical space, each image dataset comprising a plurality of correlated images captured at different exposures;
   defining a plurality of panoramic maps, each panoramic map comprising a map of color and intensity information derived from images in a corresponding one of the image sets;
   modeling a dynamic lighting model from the plurality of panoramic maps, the dynamic lighting model defining lighting for digital rendering as a function of virtual coordinates of a modeled space, wherein the modeled space corresponds to the limited physical space, and the virtual coordinates are selected from the group consisting of space coordinates, time coordinates, and any combination of space and time coordinates; and
   rendering at least a single frame using the dynamic lighting model.

2. The method of claim 1, wherein the reading step further comprises reading the image datasets corresponding to substantially different locations within the defined physical space, and wherein the modeling step further comprises defining the dynamic lighting model as a function of the virtual coordinates that define different locations within the modeled space.

3. The method of claim 1, wherein the reading step further comprises reading the image datasets corresponding to substantially different lighting conditions at different times for a selected location, and wherein the modeling step further comprises defining the dynamic lighting model as a function of the virtual coordinates that define different times.

4. The method of claim 1, wherein the modeling step further comprises modeling the dynamic lighting model as a time-independent function.

5. The method of claim 1, wherein the modeling step further comprises modeling the dynamic lighting model as a time-dependent function.

6. The method of claim 1, further comprising reading an image calibration dataset comprising images of a defined reference object linked to an identifier of a camera by which each image was captured.

7. The method of claim 6, wherein the second reading step further comprises reading the image calibration dataset comprising images of the defined reference object selected from a 20-step gray scale and a Macbeth color chart.

8. The method of claim 6, further comprising color-correcting a plurality of images of the limited physical space based on an analysis of images of the defined reference object.

9. The method of claim 6, wherein the defining step further comprises defining the plurality of panoramic maps using the images of the defined reference object to determine characteristics of at least one camera.

10. The method of claim 1, wherein the reading step further comprises reading the image datasets comprising images of a convex specularly-reflecting surface.

11. The method of claim 1, wherein the modeling step further comprises modeling the dynamic lighting model comprising at least one modeled key light, and at least one modeled fill light.

12. The method of claim 1, wherein the modeling step further comprises modeling the dynamic lighting model comprising an modeled light-emitting surface surrounding a digital object to be rendered.

13. The method of claim 12, wherein the modeling step further comprises subdividing the modeled light-emitting surface into surface regions based on a geometric relationship between a digital object to be rendered and the modeled light-emitting surface, wherein the surface regions each correspond to a projection of a defined maximum size on a surface enclosing the digital object.

14. The method of claim 1, wherein the modeling step further comprises interpolating an object-specific panorama from the plurality of panoramic maps.

15. The method of claim 14, wherein the modeling step further comprises determining at least one modeled key light and at least one modeled fill light from the object-specific panorama.

16. A method for defining lighting for rendering a digital object, the method comprising:
   reading at least one image dataset corresponding to a unique coordinate within a limited physical space, the image dataset comprising a plurality of correlated images captured at different exposures;
   defining at least one panoramic map comprising a map of color and intensity information derived from images in a corresponding one of the image sets; and
   modeling a lighting model from the panoramic map, the lighting model defining lighting for digital rendering as at least one modeled key light and at least one modeled fill light.

17. A computer-readable media containing instructions for defining lighting for rendering a digital object, the instructions comprising:
   reading image datasets each corresponding to a substantially different location or a substantially different lighting condition within a limited physical space, each image dataset comprising a plurality of correlated images captured at different exposures;
   defining a plurality of panoramic maps, each panoramic map comprising a map of color and intensity information derived from images in a corresponding one of the image sets; and
   modeling a dynamic lighting model from the plurality of panoramic maps, the dynamic lighting model defining lighting for digital rendering as a function of virtual coordinates of a modeled space, wherein the modeled space corresponds to the limited physical space, and the virtual coordinates are selected from the group consisting of space coordinates, time coordinates, and any combination of space and time coordinates.

18. The computer-readable media of claim 17, wherein the modeling instruction further comprises modeling the dynamic lighting model as a time-independent function.

19. The computer-readable media of claim 17, wherein the modeling instruction further comprises modeling the dynamic lighting model as a time-dependent function.

20. The computer-readable media of claim 17, further comprising an instruction for reading an image calibration dataset comprising images of a defined reference object linked to an identifier of a camera by which each image was captured.

21. The computer-readable media of claim 20, further comprising an instruction for color-correcting a plurality of images of the limited physical space based on an analysis of images of the defined reference object.

22. The computer-readable media of claim 20, wherein the defining instruction further comprises defining the plurality of panoramic maps using the images of the defined reference object to determine characteristics of at least one camera.

23. The computer-readable media of claim 17, wherein the reading instruction further comprises reading the image datasets comprising images of a convex specularly-reflecting surface.

24. The computer-readable media of claim 17, wherein the modeling instruction further comprises modeling the dynamic lighting model comprising at least one modeled key light, and at least one modeled fill light.

25. The computer-readable media of claim 17, wherein the modeling instruction further comprises modeling the dynamic lighting model comprising a modeled light-emitting surface surrounding a digital object to be rendered.

26. The computer-readable media of claim 25, wherein the modeling instruction further comprises subdividing the modeled light-emitting surface into surface regions based on a geometric relationship between a digital object to be rendered and the modeled light-emitting surface, wherein the surface regions each correspond to a projection of a defined maximum size on a surface enclosing the digital object.

27. The computer-readable media of claim 17, wherein the modeling step further comprises interpolating an object-specific panorama from the plurality of panoramic maps.

28. The computer-readable media of claim 27, wherein the modeling instruction further comprises determining at least one modeled key light and at least one modeled fill light from the object-specific panorama.

* * * * *